(12) United States Patent
Devireddy et al.

(10) Patent No.: US 11,570,051 B2
(45) Date of Patent: *Jan. 31, 2023

(54) METHOD, SYSTEM, AND COMPUTER PROGRAM PRODUCT FOR CONFIGURING A GATEWAY

(71) Applicant: Visa International Service Association, San Francisco, CA (US)

(72) Inventors: Swetha Devireddy, Austin, TX (US); Varsha Kadam, Austin, TX (US); Sunil Pandit, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/553,966

(22) Filed: Dec. 17, 2021

(65) Prior Publication Data
US 2022/0109608 A1    Apr. 7, 2022

Related U.S. Application Data

(63) Continuation of application No. 16/054,287, filed on Aug. 3, 2018, now Pat. No. 11,233,700.

(51) Int. Cl.
*G06Q 20/40* (2012.01)
*H04L 41/0893* (2022.01)
(Continued)

(52) U.S. Cl.
CPC ....... *H04L 41/0893* (2013.01); *G06Q 20/401* (2013.01); *H04L 41/0856* (2013.01); *H04L 41/0859* (2013.01)

(58) Field of Classification Search
CPC ...... G06Q 20/405; G06Q 20/20; G06Q 20/40; G06Q 20/3224; G06Q 20/4012; G06Q 20/4014; G06Q 20/425; G06Q 20/401
See application file for complete search history.

(56) References Cited

U.S. PATENT DOCUMENTS

| 6,119,105 A | 9/2000 | Williams |
| 7,082,460 B2 | 7/2006 | Hansen et al. |

(Continued)

FOREIGN PATENT DOCUMENTS

WO     2008085206 A2    7/2008

*Primary Examiner* — Tonia L Dollinger
*Assistant Examiner* — Linh T. Nguyen
(74) *Attorney, Agent, or Firm* — The Webb Law Firm

(57) ABSTRACT

Provided is a method for configuring a gateway. The method may include a gateway monitoring current version data stored on at least one first server. The current version data may be associated with a current version of a configuration file. The first server may be remote from the gateway. The current version data may be modified at the first server. In response to the gateway determining that the current version data stored on the first server has been modified, a configuration service may be invoked to retrieve the current version of the configuration file from at least one repository based on the current version data. The repository may include at least one second server remote from the gateway and the first server. The gateway may store a copy of the current version of the configuration file retrieved by the configuration service. A system and computer program product are also disclosed.

15 Claims, 4 Drawing Sheets

(51) Int. Cl.
    *H04L 41/0859*    (2022.01)
    *H04L 41/0853*    (2022.01)

(56) References Cited

U.S. PATENT DOCUMENTS

| | | |
|---|---|---|
| 8,504,519 B1 | 8/2013 | Sachs et al. |
| 10,057,184 B1 | 8/2018 | Prahlad et al. |
| 2002/0091753 A1 | 7/2002 | Reddy et al. |
| 2009/0187886 A1 | 7/2009 | Peck et al. |
| 2010/0017328 A1 | 1/2010 | Stephen et al. |
| 2010/0217837 A1 | 8/2010 | Ansari et al. |
| 2011/0239055 A1* | 9/2011 | Busayarat ............ G06F 11/3664 714/48 |
| 2012/0089723 A1 | 4/2012 | Mercuri |
| 2012/0143821 A1 | 6/2012 | Mallya et al. |
| 2013/0145349 A1 | 6/2013 | Basak et al. |
| 2014/0007068 A1 | 1/2014 | Cullen et al. |
| 2014/0258479 A1 | 9/2014 | Tenginakai et al. |
| 2016/0125405 A1 | 5/2016 | Alterman et al. |
| 2016/0321643 A1 | 11/2016 | Beck et al. |
| 2018/0114203 A1 | 4/2018 | Send et al. |
| 2018/0349453 A1 | 12/2018 | Khatri |
| 2019/0303930 A1* | 6/2019 | Milam ................ G06Q 20/102 |
| 2019/0312745 A1 | 10/2019 | Ansari et al. |
| 2019/0347664 A1 | 11/2019 | Agrawal et al. |
| 2019/0377762 A1 | 12/2019 | Hudak et al. |

* cited by examiner

METHOD, SYSTEM, AND COMPUTER PROGRAM PRODUCT FOR CONFIGURING A GATEWAY

CROSS-REFERENCE TO RELATED APPLICATIONS

This application is a continuation of U.S. patent application Ser. No. 16/054,287, filed Aug. 3, 2018, the disclosure of which is hereby incorporated by reference in its entirety.

BACKGROUND

1. Field

This disclosed subject matter relates generally to methods, systems, and products for configuring a gateway and, in some particular embodiments or aspects, to a method, system, and computer program product for dynamically configuring a payment gateway.

2. Technical Considerations

Certain computer systems may use configuration files to control certain functionality. For example, certain gateways (e.g., payment gateways) may use configuration files (e.g., Extensible Markup Language (XML) files and/or the like) for certain gateway functions (e.g., validation rules, transformation, response code to error code mapping, and/or the like). Such configuration files may be packaged with the application/module (e.g., gateway application) that is deployed on the gateway. As such, if a change is to be made to the configuration files or a portion thereof (e.g., a change to the validation rules, transformation, code mapping, and/or the like), an entirely new application package (including the modified configuration file) must be deployed on every node (e.g., server) using the application. However, certain computer systems (e.g., payment gateways) may employ multiple nodes (e.g., tens of nodes, 50 nodes, 75-80 nodes, hundreds of nodes, and/or the like). It can be burdensome/expensive in terms of computing resources and time consuming to individually deploy such application packages to all of the nodes. Additionally or alternatively, it may be necessary to bring the node (e.g., server) offline while the new application package is being deployed thereto. Additionally or alternatively, if the changes to the configuration files are relatively small (e.g., changes to only one or two files), it can be counterproductive to build an entire new application package and deploy the (relatively large) application package to each node (e.g., using a relatively large amount of computing resources to implement a relatively small change in the configuration files).

Additionally or alternatively, certain computer systems (e.g., payment gateways) may process a relatively large volume of data (e.g., transactions) very quickly (e.g., in a relatively short period of time). For example, a payment gateway may continuously process thousands of transactions in short time periods (e.g., 2,000-4,000 per ten seconds). However, if the aforementioned time-consuming process of deploying new application packages is used to implement modifications to the configuration files, the time elapsed may result in many (e.g., thousands) of transactions being processed with outdated configuration files. For example, transactions that should be validated based on the current configuration files may be rejected because the node at which such transactions are processed is still using previous configuration files during the time while the application packages are being deployed. Additionally or alternatively, transactions that should be rejected based on the current configuration files may be validated because the node at which such transactions are processed is still using previous configuration files during the time while the application packages are being deployed.

SUMMARY

Accordingly, it is an object of the presently disclosed subject matter to provide methods, systems, and computer program products for configuring a gateway.

According to non-limiting embodiments or aspects, provided is a method for configuring a gateway. In some non-limiting embodiments or aspects, a method for configuring a gateway may include monitoring, by a gateway, current version data stored on at least one first server. The current version data may be associated with a current version of a configuration file for the gateway. The first server(s) may be remote from the gateway. At the first server(s), the current version data may be modified. The gateway may determine that the current version data stored on the at least one first server has been modified. In response to that determination, a configuration service may be invoked. The configuration service may retrieve the current version of the configuration file from at least one repository based on the current version data. The repository may include at least one second server remote from the gateway and the first server(s). The gateway may store a copy of the current version of the configuration file retrieved by the configuration service.

In some non-limiting embodiments or aspects, monitoring the current version data may include monitoring, by a first agent on the gateway, a view of the current version data from a second agent on the at least one first server. Additionally or alternatively, determining the current version data stored on the at least one first server has been modified may include detecting, by the first agent, that the view of the current version data has been modified. Additionally or alternatively, the first agent may include a client agent of a cluster, and the second agent may include a server agent of the cluster.

In some non-limiting embodiments or aspects, the current version data may include at least one key associated with at least one identifier of the configuration file and/or at least one value associated with the current version.

In some non-limiting embodiments or aspects, determining the current version data stored on the at least one first server has been modified may include receiving, at the gateway, a notification from the first server(s) that the current version data has been modified.

In some non-limiting embodiments or aspects, the current version of the configuration file may be uploaded to the repository before modifying the current version data. Additionally or alternatively, the gateway may delete a copy of a previous version of the configuration file.

In some non-limiting embodiments or aspects, the gateway may include a payment gateway. Additionally or alternatively, the gateway may receive transaction data associated with a payment transaction. Additionally or alternatively, the gateway may validate the payment transaction based on the copy of the current version of the configuration file.

In some non-limiting embodiments or aspects, the current version of the configuration file may include at least one of the following: validation rules, transformation rules, error code mapping, or any combination thereof.

According to non-limiting embodiments or aspects, provided is a system for configuring a gateway. In some non-limiting embodiments or aspects, the system for configuring a gateway may include at least one repository, which may be configured to store a current version of a configuration file. At least one first server may be configured to store current version data associated with the current version of the configuration file. The first server(s) may be remote from the repository. A gateway may be remote from the first server(s) and the repository. The gateway may be configured to monitor the current version data stored on the at least one first server. The gateway may further be configured in response to determining that the current version data stored on the at least one first server has been modified, to invoke a configuration service. The configuration service may retrieve the current version of the configuration file from the at least one repository based on the current version data. The gateway may further be configured to store a copy of the current version of the configuration file retrieved by the configuration service.

In some non-limiting embodiments or aspects, the gateway may include a first agent. Additionally or alternatively, monitoring the current version data may include using the first agent, which may be configured to monitor a view of the current version data from a second agent on the first server(s). Additionally or alternatively, determining the current version data stored on the first server(s) has been modified may include the first agent (of the gateway) being configured to detect that the view of the current version data has been modified. In some non-limiting embodiments or aspects, the first agent may include a client agent of a cluster, and the second agent may include a server agent of the cluster.

In some non-limiting embodiments or aspects, the current version data may include at least one key associated with at least one identifier of the configuration file and at least one value associated with the current version.

In some non-limiting embodiments or aspects, determining the current version data stored on the at least one first server has been modified may include the gateway being configured to receive a notification from the first server(s) that the current version data has been modified.

In some non-limiting embodiments or aspects, the repository may be configured to have the current version of the configuration file uploaded thereto. Additionally or alternatively, the first server(s) may be configured to have the current version data thereon modified in response to the current version of the configuration file being uploaded to the repository.

In some non-limiting embodiments or aspects, the gateway may be configured to delete a copy of a previous version of the configuration file.

In some non-limiting embodiments or aspects, the gateway may include a payment gateway. Additionally or alternatively, the gateway may be configured to receive transaction data associated with a payment transaction. Additionally or alternatively, the gateway may be configured to validate the payment transaction based on the copy of the current version of the configuration file.

In some non-limiting embodiments or aspects, the current version of the configuration file may include at least one of the following: validation rules, transformation rules, error code mapping, or any combination thereof.

According to non-limiting embodiments or aspects, provided is a computer program product for configuring a gateway. The computer program product may include at least one non-transitory computer-readable medium including one or more instructions that, when executed by at least one processor, cause the at least one processor to monitor current version data stored on at least one first server. The current version data may be associated with a current version of a configuration file for a gateway. The first server(s) may be remote from the gateway. In response to determining that the current version data stored on the at least one first server has been modified, a configuration service may be invoked. The configuration service may retrieve the current version of the configuration file from at least one repository based on the current version data. The repository may include at least one second server remote from the gateway and the first server(s). A copy of the current version of the configuration file retrieved by the configuration service may be stored.

In some non-limiting embodiments or aspects, monitoring the current version data may include monitoring, by a first agent on the gateway, a view of the current version data from a second agent on the first server(s). Additionally or alternatively, determining the current version data stored on the first server(s) has been modified may include detecting, by the first agent, that the view of the current version data has been modified. Additionally or alternatively, the first agent may include a client agent of a cluster, and the second agent may include a server agent of the cluster.

In some non-limiting embodiments or aspects, the current version data may include at least one key associated with at least one identifier of the configuration file and at least one value associated with the current version.

In some non-limiting embodiments or aspects, determining the current version data stored on the first server(s) has been modified may include receiving a notification from the first server(s) that the current version data has been modified.

In some non-limiting embodiments, the current version of the configuration file may be uploaded to the repository before modifying the current version data. In some non-limiting embodiments or aspects, a copy of a previous version of the configuration file may be deleted (e.g., at the gateway).

In some non-limiting embodiments or aspects, the gateway may include a payment gateway. Additionally or alternatively, the instructions, when executed by the processor(s), may further cause the at least one processor to receive transaction data associated with a payment transaction and/ or validate the payment transaction based on the copy of the current version of the configuration file.

In some non-limiting embodiments or aspects, the current version of the configuration file may include at least one of the following: validation rules, transformation rules, error code mapping, and/or any combination thereof.

Further embodiments or aspects are set forth in the following numbered clauses:

Clause 1: A method for configuring a gateway, comprising: monitoring, by a gateway, current version data stored on at least one first server, the current version data associated with a current version of a configuration file for the gateway, the at least one first server remote from the gateway; modifying, on the at least one first server, the current version data; in response to determining, by the gateway, that the current version data stored on the at least one first server has been modified, invoking a configuration service, wherein the configuration service retrieves the current version of the configuration file from at least one repository based on the current version data, the at least one repository comprising at least one second server remote from the gateway and the at least one first server; storing, by the gateway, a copy of the current version of the configuration file retrieved by the configuration service.

Clause 2: The method of clause 1, wherein monitoring the current version data comprises monitoring, by a first agent on the gateway, a view of the current version data from a second agent on the at least one first server.

Clause 3: The method of clauses 1 or 2, wherein determining the current version data stored on the at least one first server has been modified comprises detecting, by the first agent, that the view of the current version data has been modified.

Clause 4: The method of any preceding clause, wherein the first agent comprises a client agent of a cluster, and the second agent comprises a server agent of the cluster.

Clause 5: The method of any one of clauses 1-4, wherein the current version data comprises at least one key associated with at least one identifier of the configuration file and at least one value associated with the current version.

Clause 6: The method of any one of clauses 1-5, wherein determining the current version data stored on the at least one first server has been modified comprises receiving, at the gateway, a notification from the at least one first server that the current version data has been modified.

Clause 7: The method of any one of clauses 1-6, further comprising uploading, to the at least one repository, the current version of the configuration file before modifying the current version data.

Clause 8: The method of any one of clauses 1-7, further comprising deleting, by the gateway, a copy of a previous version of the configuration file.

Clause 9: The method of any one of clauses 1-8, wherein the gateway comprises a payment gateway, the method further comprising: receiving, at the gateway, transaction data associated with a payment transaction; and validating, by the gateway, the payment transaction based on the copy of the current version of the configuration file.

Clause 10: The method of any one of clauses 1-9, wherein the current version of the configuration file comprises at least one of the following: validation rules, transformation rules, error code mapping, or any combination thereof.

Clause 11: A system for configuring a gateway, comprising: at least one repository configured to store a current version of a configuration file; at least one first server configured to store current version data associated with the current version of the configuration file, the at least one first server remote from the at least one repository; a gateway remote from the at least one first server and the at least one repository; the gateway configured to: monitor the current version data stored on the at least one first server; in response to determining that the current version data stored on the at least one first server has been modified, invoke a configuration service, wherein the configuration service retrieves the current version of the configuration file from the at least one repository based on the current version data; store a copy of the current version of the configuration file retrieved by the configuration service.

Clause 12: The system of clause 11, wherein the gateway comprises a first agent, and wherein monitoring the current version data comprises the first agent being configured to monitor a view of the current version data from a second agent on the at least one first server.

Clause 13: The system of clause 11 or 12, wherein determining the current version data stored on the at least one first server has been modified comprises the first agent being configured to detect that the view of the current version data has been modified.

Clause 14: The system of any one of clauses 11-13, wherein the first agent comprises a client agent of a cluster, and the second agent comprises a server agent of the cluster.

Clause 15: The system of any one of clauses 11-14, wherein the current version data comprises at least one key associated with at least one identifier of the configuration file and at least one value associated with the current version.

Clause 16: The system of any one of clauses 11-15, wherein determining the current version data stored on the at least one first server has been modified comprises the gateway being configured to receive a notification from the at least one first server that the current version data has been modified.

Clause 17: The system of any one of clauses 11-16, wherein the at least one repository is configured to have the current version of the configuration file uploaded thereto, and wherein the at least one server is configured to have the current version data thereon modified in response to the current version of the configuration file being uploaded to the at least one repository.

Clause 18: The system of any one of clauses 11-17, wherein the gateway is configured to delete a copy of a previous version of the configuration file.

Clause 19: The system of any one of clauses 11-18, wherein the gateway comprises a payment gateway, the gateway configured to: receive transaction data associated with a payment transaction; and validate the payment transaction based on the copy of the current version of the configuration file.

Clause 20: The system of any one of clauses 11-19, wherein the current version of the configuration file comprises at least one of the following: validation rules, transformation rules, error code mapping, or any combination thereof.

Clause 21: A computer program product for configuring a gateway, the computer program product comprising at least one non-transitory computer-readable medium including one or more instructions that, when executed by at least one processor, cause the at least one processor to: monitor current version data stored on at least one first server, the current version data associated with a current version of a configuration file for a gateway, the at least one first server remote from the gateway; in response to determining that the current version data stored on the at least one first server has been modified, invoke a configuration service, wherein the configuration service retrieves the current version of the configuration file from at least one repository based on the current version data, the at least one repository comprising at least one second server remote from the gateway and the at least one first server; store a copy of the current version of the configuration file retrieved by the configuration service.

Clause 22: The computer program product of clause 21, wherein monitoring the current version data comprises monitoring, by a first agent on the gateway, a view of the current version data from a second agent on the at least one first server.

Clause 23: The computer program product of clause 21 or 22, wherein determining the current version data stored on the at least one first server has been modified comprises detecting, by the first agent, that the view of the current version data has been modified.

Clause 24: The computer program product of any one of clauses 21-23, wherein the first agent comprises a client agent of a cluster, and the second agent comprises a server agent of the cluster.

Clause 25: The computer program product of any one of clauses 21-24, wherein the current version data comprises at least one key associated with at least one identifier of the configuration file and at least one value associated with the current version.

Clause 26: The computer program product of any one of clauses 21-25, wherein determining the current version data stored on the at least one first server has been modified comprises receiving a notification from the at least one first server that the current version data has been modified.

Clause 27: The computer program product of any one of clauses 21-26, wherein the one or more instructions, when executed by the at least one processor, further cause the at least one processor to upload, to the at least one repository, the current version of the configuration file before modifying the current version data.

Clause 28: The computer program product of any one of clauses 21-27, wherein the one or more instructions, when executed by the at least one processor, further cause the at least one processor to delete a copy of a previous version of the configuration file.

Clause 29: The computer program product of any one of clauses 21-28, wherein the gateway comprises a payment gateway, wherein the one or more instructions, when executed by the at least one processor, further cause the at least one processor to: receive transaction data associated with a payment transaction; and validate the payment transaction based on the copy of the current version of the configuration file.

Clause 30: The computer program product of any one of clauses 21-29, wherein the current version of the configuration file comprises at least one of the following: validation rules, transformation rules, error code mapping, or any combination thereof.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which.

DESCRIPTION

Figure 1:
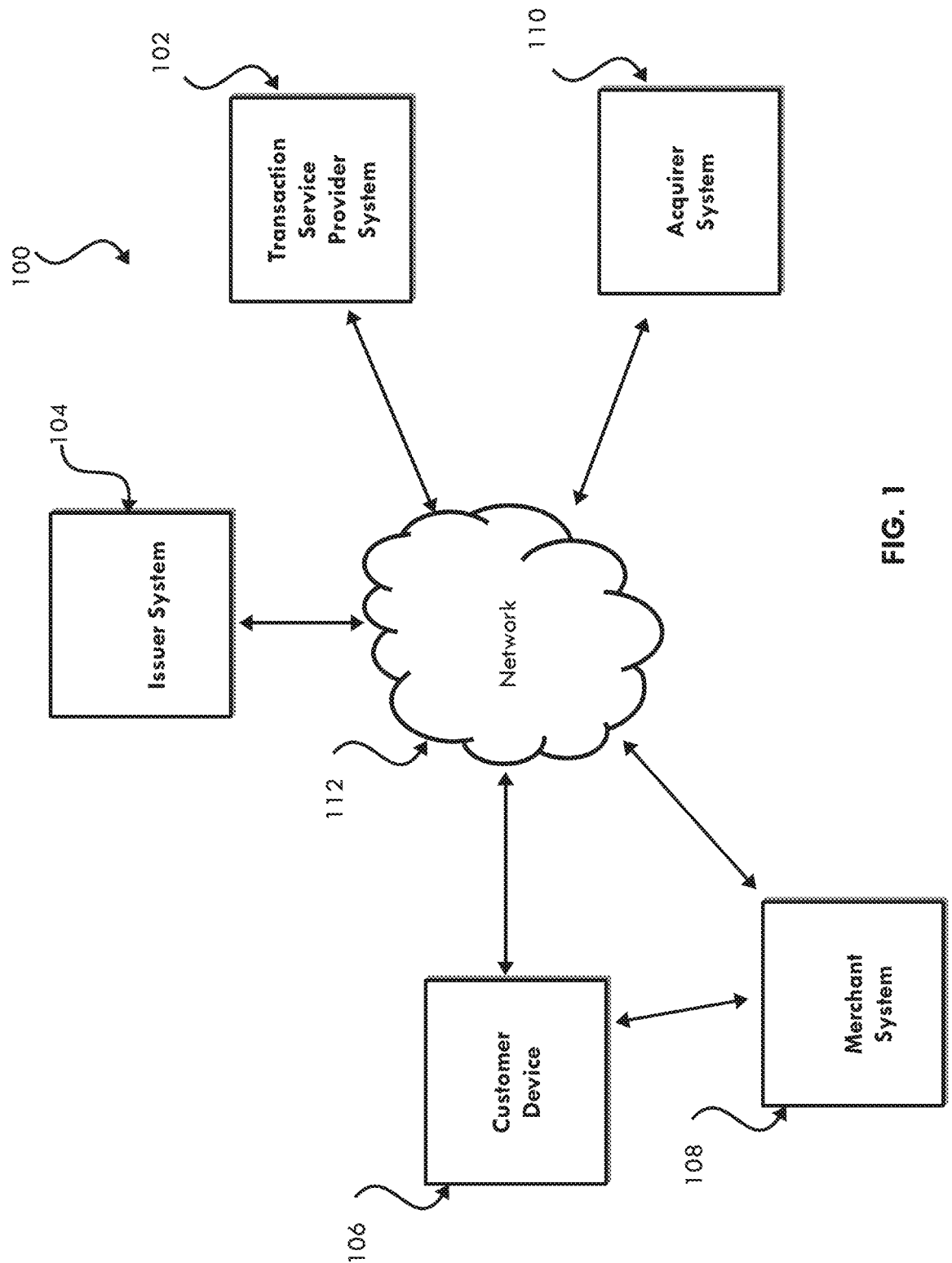
FIG. 1 is a diagram of a non-limiting embodiment or aspect of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a primary account number, a card number, a payment card number, a token, and/or the like). In some non-limiting embodiments or aspects, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived (e.g., with a one-way hash or other cryptographic function). Further, in some non-limiting embodiments or aspects, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments or aspects, a requestor may interface with a network token system through any suitable communication network and/or protocol (e.g., using HTTPS, SOAP and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers.

In some non-limiting embodiments or aspects, this information may be subject to reporting and audit by the token service provider.

As used herein, the term a "token service provider" may refer to an entity including one or more server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments or aspects, the token service provider may have the ability to set aside licensed BINs as token BINs to issue tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments or aspects of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, "merchant system" may refer to one or more computer systems operated by or on behalf of a merchant, such as a server computer executing one or more software applications. As used herein, the term "product" may refer to one or more goods and/or services offered by a merchant.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed systems, methods, and computer program products for configuring a gateway, including, but not limited to, configuring a payment gateway. For example, non-limiting embodiments or aspects of the disclosed subject matter provide configuring a gateway with a configuration service to retrieve current configuration files in response to determining current version data stored on a remote server has been modified. Such embodiments or aspects provide techniques and systems for dynamic updating/retrieval of the configuration file(s) without the need to build and/or deploy the entire application package to (each node of) the gateway. Additionally or alternatively, such techniques and systems may include monitoring the current version data by (each node of) the gateway so that (each node of) the gateway may automatically determine/be notified whenever there is a modification of the configuration file and retrieve the current version of the configuration file automatically. Additionally or alternatively, such techniques and systems may include (simultaneous and/or parallel) retrieval of the configuration file from the (central) repository by (each node of) the gateway (e.g., rather than individual and/or series uploading of the application package to each node). As such, (each node of) the gateway may identify and retrieve the current version of the configuration file using less computing resources and with less delay (e.g., compared to uploading the entire application package to each node of the gateway individually), and the configuration file need only be uploaded once to the (central) repository, from which (each node of) the gateway may retrieve/download a copy. Accordingly, such techniques and systems may reduce total cost (e.g., in terms of computing resources, price, and/or the like) and reduce time to market. Additionally or alternatively, where there is a production issue that can be resolved by changing the configuration file, such techniques or systems may allow the configuration file to be modified and uploaded to the (central) repository, and the modified/current version of the configuration file may be automatically retrieved by all nodes. Additionally or alternatively, such techniques and systems may reduce transaction loss as (each node of) the gateway need not be taken offline and the time period to deploy the modified/updated configuration file is reduced. Additionally or alternatively, such techniques and systems may reduce operation cost, new application code, and/or packaging need not be built/deployed to deploy the modified/updated configuration file.

For the purpose of illustration, in the following description, while the presently disclosed subject matter is described with respect to methods, systems, and computer program products for configuring a gateway, e.g., dynamically configuring a payment gateway, one skilled in the art will recognize that the disclosed subject matter is not limited to the illustrative embodiments or aspects. For example, the methods, systems, and computer program products described herein may be used with a wide variety of settings, such as configuring a gateway and/or computer system in any setting suitable for using such gateway and/or computer system or for evaluating data based on such configurations, e.g., to detect fraud, to manage network traffic, to manage and/or filter electronic communications (e.g., emails, message, posts, and/or the like), to manage creation of and/or changes to accounts (e.g., at a bank, at a merchant, at a website, at a social networking platform, and/or the like), and/or the like.

Referring now to FIG. 1, FIG. 1 is a diagram of a non-limiting embodiment or aspect of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via the network, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments or aspects, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
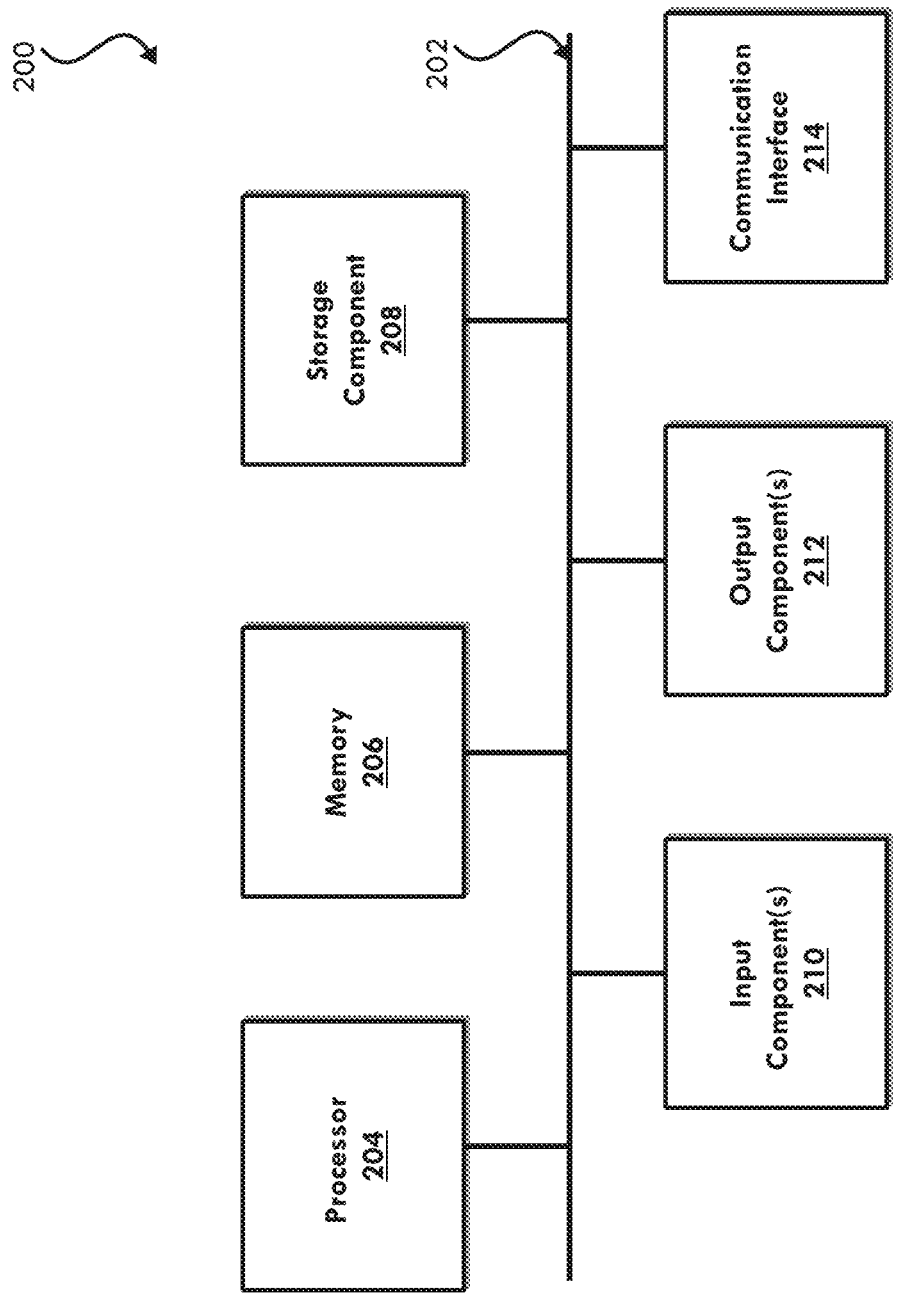
FIG. 2 is a diagram of a non-limiting embodiment or aspect of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
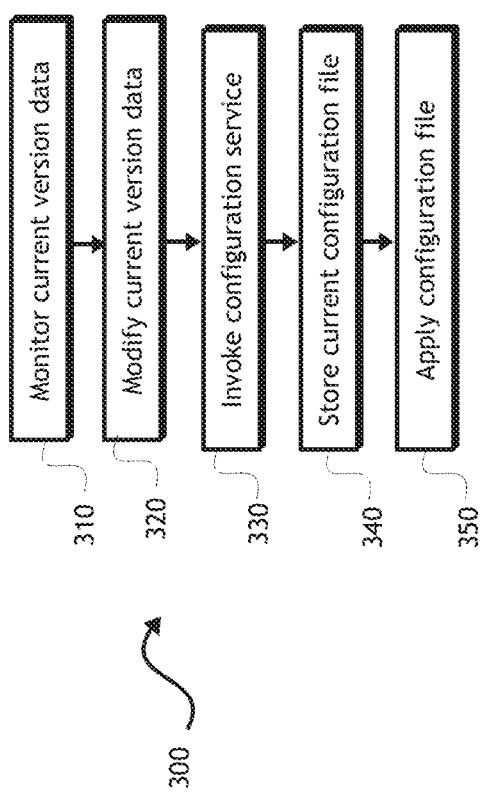
FIG. 3 is a flowchart of a non-limiting embodiment or aspect of a process for configuring a gateway according to the principles of the presently disclosed subject matter.

Referring now to FIG. 3, FIG. 3 is a flowchart of a non-limiting embodiment or aspect of a process 300 for configuring a gateway. In some non-limiting embodiments or aspects, one or more of the steps of process 300 may be performed (e.g., completely, partially, and/or the like) by transaction service provider system 102 (e.g., one or more devices of transaction service provider system 102). In some non-limiting embodiments or aspects, one or more of the steps of process 300 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, with reference to FIG. 3, a gateway (and/or node thereof) may be the same as or similar to one or more devices of transaction service provider system 102.

Additionally or alternatively, at least one first server may be the same as or similar to one or more devices of transaction service provider system 102. Additionally or alternatively, a repository and/or at least one second server may be the same as or similar to one or more devices of transaction service provider system 102.

As shown in FIG. 3, at step 310, process 300 may include monitoring current version data. For example, a gateway node (e.g., one or more devices of transaction service provider system 102) may monitor the current version data stored on at least one first server (e.g., one or more devices of transaction service provider system 102), which may be separate from and/or remote from the gateway node. In some non-limiting embodiments or aspects, the gateway node may be a node of an online gateway service (OGS). In some non-limiting embodiments or aspects, the current version data may be associated with a current version of a configuration file for the gateway (and/or for nodes thereof). In some non-limiting embodiments or aspects, the current version of the configuration file may be stored on at least one repository. Additionally or alternatively, the at least one repository may include at least one second server (e.g., one or more devices of transaction service provider system 102). In some non-limiting embodiments or aspects, the repository (e.g., second server(s)) may be separate from and/or remote from the gateway and the first server(s). In some non-limiting embodiments or aspects, the repository may include a content platform (e.g., Hitachi Content Platform (HCP) and/or the like).

In some non-limiting embodiments or aspects, monitoring the current version data may include using a first agent on the gateway node to monitor a view of the current version data from a second agent on the at least one first server. For example, the first agent may include a client agent of a cluster. Additionally or alternatively, the second agent may include a server agent of the cluster. In some non-limiting embodiments or aspects, the first agent may be a Consul client agent (e.g., Consul agent in client mode) of the gateway node, and the second agent may be a Consul server agent (e.g., Consul agent in server mode) of the first server. In some non-limiting embodiments or aspects, the client agent may perform a "watch" command to monitor the current version data.

In some non-limiting embodiments or aspects, the current version data may include data identifying the current version of the configuration file. In some non-limiting embodiments, the current version data may include a value of at least one field (e.g., a version number). In some non-limiting embodiments, the current version data may include at least one key associated with at least one identifier of the configuration file and at least one value associated with the current version (e.g., a current version number). For example, the key(s) may include any suitable key(s) uniquely associated with the identifier. Additionally or alternatively, the identifier(s) may include any suitable identifier(s) to uniquely identify the configuration file. Additionally or alternatively, the value(s) may include any suitable value or set of values to uniquely identify the version (e.g., a single number, a set of numbers, a semantic versioning number, and/or the like). For the purpose of illustration, a semantic versioning number may include three numbers separated by periods (e.g., 3.1.2) or four numbers separated by periods (e.g., 3.1.2.1), and the numbers may represent major version, minor version, patch version, and/or build version, which may be in that order. In some non-limiting embodiments, the current version data may include an identifier (e.g., a file name, a field name, an address and/or location on the repository, and/or the like) such as "GatewayCurrentVersion" (or, e.g., "CurrentConfigVersion," "CieloCurrentVersion" for a Cielo gateway, and/or the like) and a version number (e.g., 3.1.2 and/or the like).

In some non-limiting embodiments or aspects, each version of the configuration file (e.g., the current version thereof) may include at least one of validation rules (e.g., "GatewayValidation," "GatewayRPG," "CieloRPG," and/or the like), transformation rules (e.g., "GatewayTransformation," "CieloTransformation," and/or the like), error code and/or response code mapping (e.g., "GatewayCodeMap," "GatewayErrorCode," "CieloErrorCode," and/or the like), and/or any combination thereof. In some non-limiting embodiments or aspects, each of these listed items may include one or more files (e.g., XML files and/or the like). Additionally or alternatively, each version of the configuration file (e.g., the current version thereof) may include at least one application programming interface (API).

As shown in FIG. 3, at step 320, process 300 may include modifying the current version data. For example, the current version data stored on the first server(s) (e.g., one or more devices of transaction service provider system 102) may be modified. In some non-limiting embodiments or aspects, the current version data stored on the first server(s) may be modified after and/or in response to uploading of the current version of the configuration file to at least one repository (e.g., one or more devices of transaction service provider system 102). In some non-limiting embodiments or aspects, the at least one repository may include at least one second server (e.g., one or more devices of transaction service provider system 102), which may be separate from and/or remote from the gateway and the first server(s).

In some non-limiting embodiments or aspects, modifying the current version data may include modifying (e.g., changing, replacing, and/or the like) at least a portion of the current version data. For example, the value(s) (e.g., version number(s)) of the current version data may be modified to reflect the availability of a new (current) version of the configuration file. For the purpose of illustration, a value associated with a previous version (e.g., 3.1.2) may be replaced with a value of the current version (e.g., 3.1.4). Additionally or alternatively, in some non-limiting embodiments or aspects, the identifier (e.g., a file name, a field name, an address and/or location on the repository, and/or the like) may be modified to reflect the availability of a new (current version of the) configuration file.

In some non-limiting embodiments or aspects, the current version of the configuration file may be uploaded to the repository before modifying the current version data. For example, the current version data may be modified in response to the uploading of the current version of the configuration file to the repository. For example, when a new (current version of the) configuration file is uploaded (e.g., from an operations group, a developer, a product and/or application owner, another remote device and/or server, software such as Presto, and/or the like), the current version data (e.g., "GatewayCurrentVersion") may be modified (e.g., automatically based on the current version number or identifier, manually by an operations group or a product and/or application owner, and/or the like) at the first server (e.g., Consul server agent). Additionally or alternatively, in response to the modification of the current version data, the gateway node (e.g., Consul client agent performing a "watch" of the current version data) may determine and/or be notified of the change, as described herein.

As shown in FIG. 3, at step 330, process 300 may include invoking a configuration service. For example, the gateway node (e.g., one or more devices of transaction service provider system 102) may invoke the configuration service. In some non-limiting embodiments or aspects, the gateway node may invoke the configuration service after and/or in response to determining that the current version data stored on the first server(s) (e.g., one or more devices of transaction service provider system 102) has been modified. In some non-limiting embodiments or aspects, the configuration service may retrieve the current version of the configuration file from the repository (and/or second server(s)) based on the current version data.

In some non-limiting embodiments or aspects, the gateway node may determine the current version data stored on the first server(s) has been modified based on using an agent (e.g., client agent such as Consul client agent) to detect that the view of the current version data has been modified. Additionally or alternatively, the gateway node may determine the current version data stored on the first server(s) has been modified based on receiving a notification (e.g., from the first server) that the current version data has been modified.

In some non-limiting embodiments, the configuration service may provide services around retrieving configuration files from the repository (e.g., HCP). For example, the gateway node (e.g., node of OGS) may read the current version data (e.g., "GatewayCurrentVersion") from the first server and/or receive a notification from the first server that the current version data has been modified. Additionally or alternatively, the gateway node may invoke the configuration service to retrieve (e.g., download) the current version of the configuration file from the repository (e.g., HCP) based on the current version data.

As shown in FIG. 3, at step 340, process 300 may include storing a copy of the current version of the configuration file. For example, the gateway node (e.g., one or more devices of transaction service provider system 102) may store a copy of the current version of the configuration file retrieved by the configuration service. For example, the gateway node may store the configuration file in a memory (e.g., cache memory).

In some non-limiting embodiments or aspects, the gateway node may clear the previous version of the configuration file, which may be before, simultaneously with, or after the gateway node invokes the configuration service to retrieve the current version of the configuration file and/or before, simultaneously with, or after the gateway node stores (e.g., caches) the current version of the configuration file. For example, the gateway node may delete a copy of a previous version of the configuration file from its memory (e.g., cache memory).

As shown in FIG. 3, at step 350, process 300 may include applying the configuration file. For example, the gateway node (e.g., one or more devices of transaction service provider system 102) may use the configuration file with one or more applications (e.g., rapid processing gateway (RPG) applications) deployed thereon.

In some non-limiting embodiments or aspects, the gateway may include a payment gateway (e.g., OGS), and the gateway node may include a payment gateway application (e.g., RPG). For example, the gateway node may receive transaction data associated with a payment transaction. Additionally or alternatively, the gateway node may take action on the payment transaction (e.g., validate the transaction, reject the transaction, and/or the like) based (at least partially) on the copy of the current version of the configuration file stored on the gateway node.

In some non-limiting embodiments or aspects, the current version of the configuration file may include at least one of validation rules, transformation rules, error code mapping, or any combination thereof. Additionally or alternatively, applying the configuration file may include the gateway node applying the validation rules, transformation rules, error code mapping, or any combination thereof, respectively, to a transaction received by the gateway node.

Figure 4:
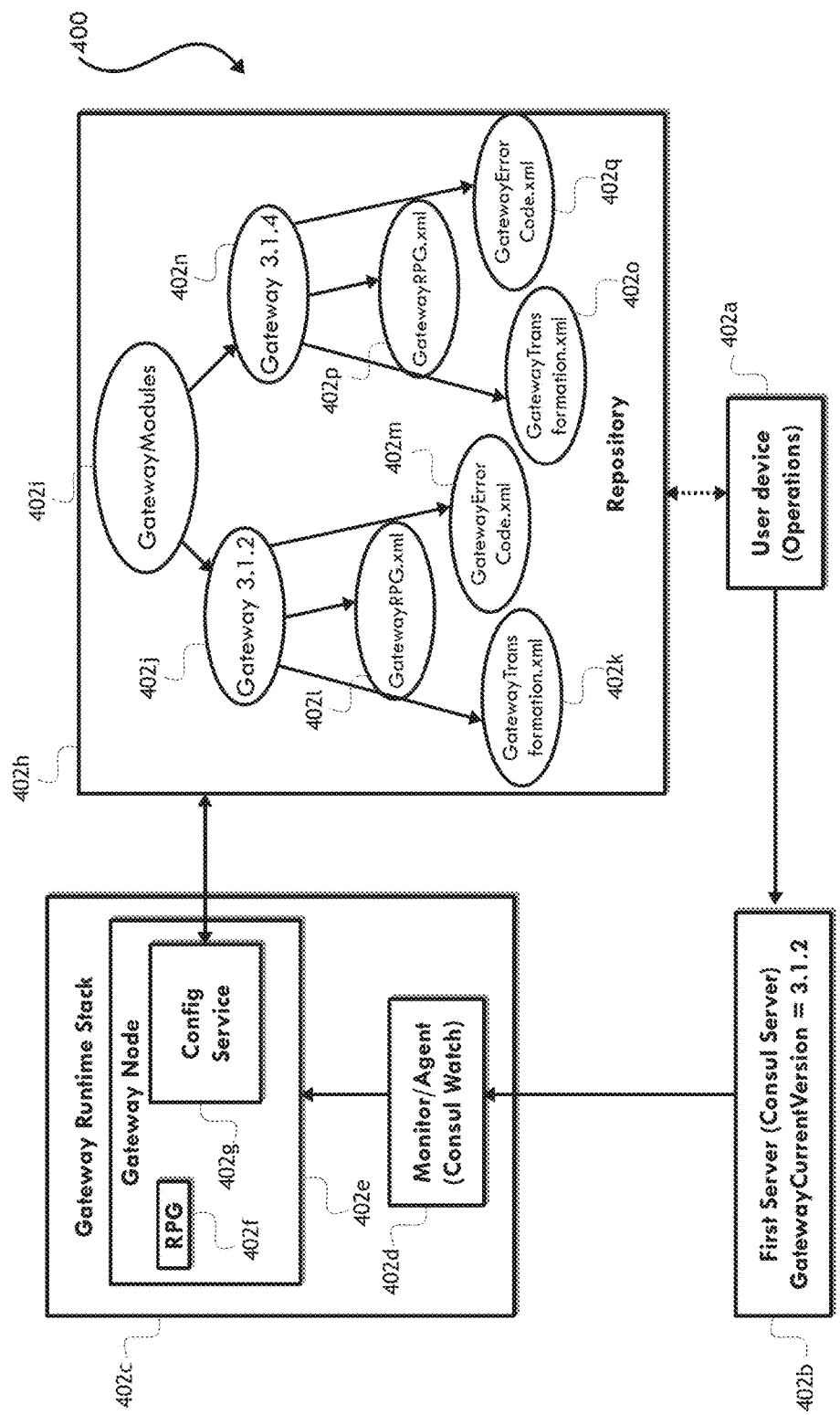
FIG. 4 is a diagram of a non-limiting embodiment or aspect of an implementation of a non-limiting embodiment or aspect of the process shown in FIG. 3.

Referring now to FIG. 4, FIG. 4 is a diagram of an exemplary implementation 400 of a non-limiting embodiment or aspect relating to process 300 shown in FIG. 3. As shown in FIG. 4, implementation 400 may include user device 402a, first server 402b, gateway runtime stack 402c, monitor 402d, gateway node 402e, rapid processing gateway 402f, configuration service 402g, repository 402h, gateway module 402i, previous version of configuration files 402j (including previous transformation rule file 402k, previous validation rule file 402l, and/or previous code mapping file 402m), and/or current version of configuration files 402n (including current transformation rule file 402o, current validation rule file 402p, and/or current code mapping file 402q). In some non-limiting embodiments or aspects, each of user device 402a, first server 402b, gateway runtime stack 402c, monitor 402d, gateway node 402e, rapid processing gateway 402f, configuration service 402g, repository 402h, gateway module 402i, previous version of configuration files 402j (including previous transformation rule file 402k, previous validation rule file 402l, and/or previous code mapping file 402m), and/or current version of configuration files 402n (including current transformation rule file 402o, current validation rule file 402p, and/or current code mapping file 402q) may be implemented (e.g., completely, partially, and/or the like) by transaction service provider system 102 (e.g., one or more devices of transaction service provider system 102). Additionally or alternatively, one or more of user device 402a, first server 402b, gateway runtime stack 402c, monitor 402d, gateway node 402e, rapid processing gateway 402f, configuration service 402g, repository 402h, gateway module 402i, previous version of configuration files 402j (including previous transformation rule file 402k, previous validation rule file 402l, and/or previous code mapping file 402m), and/or current version of configuration files 402n (including current transformation rule file 402o, current validation rule file 402p, and/or current code mapping file 402q) may be implemented (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

In some non-limiting embodiments or aspects, user device 402a may include one or more devices (e.g., one or more devices of transaction service provider system 102) of a user (e.g., an operations group, a developer, a product and/or application owner, and/or the like). In some non-limiting embodiments or aspects, user device 402a may be used to upload the current version(s) of the configuration file(s) to the repository 402h, as described herein. Additionally or alternatively, user device 402a may be used to modify (e.g., automatically based on uploading of the configuration files to the repository or manually) the current version data on the first server 402b, as described herein.

In some non-limiting embodiments or aspects, first server 402b may include one or more devices and/or servers (e.g., one or more devices of transaction service provider system 102). In some non-limiting embodiments or aspects, first server 402b may store the current version data, as described herein. Additionally or alternatively, first server 402b may notify gateway node 402e (and/or the monitor 402d) thereon, as described herein. In some non-limiting embodiments or aspects, first server 402b may include a server agent (e.g., Consul server agent), as described herein.

In some non-limiting embodiments or aspects, gateway runtime stack 402c may include one or more gateway nodes 402e. For example, each gateway node 402e may include one or more devices and/or servers (e.g., one or more devices of transaction service provider system 102), as described herein. In some non-limiting embodiments or aspects, gateway runtime stack 402c may include an OGS runtime stack. Additionally or alternatively, gateway runtime stack 402c may include a payment gateway runtime stack. In some non-limiting embodiments, gateway runtime stack 402c may include additional functionality, services, devices, and/or the like, in addition to gateway node(s) 402e. For example, gateway runtime stack 402c may include monitor/agent 402d (e.g., a client agent such as a Consul client agent) to monitor the current version data at first server 402b, as described herein. Additionally or alternatively, each gateway node 402e may have its own monitor/agent 402d (e.g., a client agent such as a Consul client agent), as described herein.

In some non-limiting embodiments or aspects, gateway node 402e may include one or more devices and/or servers (e.g., one or more devices of transaction service provider system 102), as described herein. In some non-limiting embodiments or aspects, gateway node 402e may include monitor/agent 402d (e.g., a client agent such as a Consul client agent), as described herein. Additionally or alternatively, gateway node 402e may include gateway application(s) 402f (e.g., RPG application) and/or a configuration service 402g, as described herein. In some non-limiting embodiments or aspects, in response to a determination that the current version data on first server 402b has been modified (e.g., based on monitor/agent 402d detecting the current version data has been and/or receiving a notification that the current data has been modified), gateway node 402e may invoke the configuration server 402g to retrieve the current version(s) of the configuration file(s) from repository 402h, as described herein.

In some non-limiting embodiments or aspects, repository 402h may include one or more devices and/or servers (e.g., one or more devices of transaction service provider system 102), as described herein. Additionally or alternatively, repository 402h may include one or more gateway module(s) 402i associated with versions of the configuration file(s) uploaded to repository 402h. In some non-limiting embodiments or aspects, gateway module(s) 402i may include modules for each of at least one previous version of configuration file(s) 402j and/or current version of configuration file(s) 402n. For example, previous version of configuration file(s) 402j may each include one or more files (e.g., XML files and or the like). For the purpose of illustration, such files may include previous transformation rule file 402k (e.g., "GatewayRPG.xml"), previous validation rule file 402l (e.g., "GatewayRPG.xml"), previous error and/or response code mapping file 402m ("GatewayErrorCode.xml"), and/or any combination thereof. Additionally or alternatively, current version of configuration file(s) 402n may include one or more files (e.g., XML files and or the like). For the purpose of illustration, such files may include current transformation rule file 402o (e.g., "Gateway-RPG.xml"), current validation rule file 402p (e.g., "GatewayRPG.xml"), current error and/or response code mapping file 402q ("GatewayErrorCode.xml"), and/or any combination thereof.

In some non-limiting embodiments or aspects, repository 402h may be configured to store current version of configuration file(s) 402n, as described herein. In some non-limiting embodiments or aspects, first server(s) 402b may be configured to store current version data associated with current version of configuration file(s) 402n, as described herein. Additionally or alternatively, first server(s) 402b may be remote and/or separate from repository 402h, as described herein. In some non-limiting embodiments or aspects, each gateway node 402e (e.g., of gateway runtime stack 402c) may be remote from first server(s) 402b and repository 402h, as described herein. Additionally or alternatively, each gateway node 402e may be configured to monitor the current version data stored on first server(s) 402b (e.g., using monitor/agent 402d), as described herein. Additionally or alternatively, in response to determining that the current version data stored on first server(s) 402b has been modified (e.g., using monitor/agent 402d), each gateway node 402e may be configured to invoke configuration service 402g, as described herein. For example, configuration service 402g may retrieve (e.g., each gateway node 402e may be configured to use configuration server 402g to retrieve) current version of configuration file(s) 402n from repository 402h based on the current version data, as described herein. Additionally or alternatively, each gateway node 402e may be configured to store a copy of current version of configuration file(s) 402n retrieved by configuration service 402g, as described herein.

In some non-limiting embodiments or aspects, gateway node 402e may be configured to delete its copy of previous version of configuration file(s) 402j, as described herein. For example, gateway node 402e may delete the copy of previous version of configuration file(s) 402j before, simultaneously with, or after invoking configuration service 402g to retrieve current version of configuration file(s) 402n, as described herein.

In some non-limiting embodiments or aspects, each gateway node 402e may be configured to apply the current version of configuration file(s) 402n after retrieval thereof, as described herein. In some non-limiting embodiments or aspects, the gateway (e.g., gateway runtime stack 402c and/or gateway node(s) 402e thereof) may include a payment gateway, as described herein. Additionally or alternatively, each gateway node 402e may receive transaction data associated with one or more payment transactions, as described herein. Additionally or alternatively, each gateway node 402e may apply current version of configuration file(s) 402n to the payment transaction(s) (e.g., to validate and/or reject each payment transaction based on the copy of current version of configuration file 402n), as described herein.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method for configuring a payment gateway of a transaction service provider system, comprising:

monitoring, by a payment gateway of a transaction service provider system that receives transaction authorization requests from merchant systems and communicates with issuer systems, current validation rules version data stored on at least one first server, the current validation rules version data associated with a current version of a validation rules configuration file for the payment gateway, the at least one first server remote from the payment gateway, wherein the current validation rules version data comprises at least one key associated with at least one identifier of the validation rules configuration file and at least one value associated with the current version, wherein monitoring comprises performing, by a first agent on the payment gateway, a watch command to monitor a view of the at least one value from a second agent on the at least one first server based on the at least one key associated with the at least one identifier of the validation rules configuration file;

determining, by the payment gateway, that the current validation rules version data stored on the at least one first server has been modified;

in response to determining that the current validation rules version data has been modified, invoking, by the payment gateway, a configuration service, wherein the configuration service retrieves the current version of the validation rules configuration file from at least one repository based on the current validation rules version data, the at least one repository comprising at least one second server remote from the payment gateway and the at least one first server;

storing, by the payment gateway, a copy of the current version of the validation rules configuration file retrieved by the configuration service;

receiving, by the payment gateway, a first transaction authorization request from a merchant system;

applying, by the payment gateway, the copy of the current version of the validation rules configuration file to the first transaction authorization request; and validating, by the payment gateway, the first transaction authorization request based on applying the copy of the current version of the validation rules configuration file to the first transaction authorization request.

2. The method of claim 1, wherein determining the current validation rules version data stored on the at least one first server has been modified comprises detecting, by the first agent, that the view of the current validation rules version data has been modified.

3. The method of claim 1, wherein the first agent comprises a client agent of a cluster, and the second agent comprises a server agent of the cluster.

4. The method of claim 1, further comprising:

uploading, to the at least one repository, the current version of the validation rules configuration file; and in response to the current version of the validation rules configuration file being uploaded to the at least one repository, modifying, at the at least one first server, the current validation rules version data before determining, by the payment gateway, that the current validation rules version data has been modified.

5. The method of claim 1, further comprising deleting, by the payment gateway, a copy of a previous version of the validation rules configuration file.

6. A system for configuring a payment gateway of a transaction service provider system, comprising:

a payment gateway of a transaction service provider system that receives transaction authorization requests from merchant systems and communicates with issuer systems, the payment gateway configured to:

monitor current validation rules version data stored on at least one first server, the current validation rules version data associated with a current version of a validation rules configuration file for the payment gateway, the at least one first server remote from the payment gateway, wherein the current validation rules version data comprises at least one key associated with at least one identifier of the validation rules configuration file and at least one value associated with the current version, wherein monitoring comprises performing, by a first agent on the payment gateway, a watch command to monitor a view of the at least one value from a second agent on the at least one first server based on the at least one key associated with the at least one identifier of the validation rules configuration file;

determine that the current validation rules version data stored on the at least one first server has been modified;

in response to determining that the current validation rules version data has been modified, invoke a configuration service, wherein the configuration service retrieves the current version of the validation rules configuration file from at least one repository based on the current validation rules version data, the at least one repository comprising at least one second server remote from the payment gateway and the at least one first server;

store a copy of the current version of the validation rules configuration file retrieved by the configuration service;

receive a first transaction authorization request from a merchant system;

apply the copy of the current version of the validation rules configuration file to the first transaction authorization request; and validate the first transaction authorization request based on applying the copy of the current version of the validation rules configuration file to the first transaction authorization request.

7. The system of claim 6, wherein determining the current validation rules version data stored on the at least one first server has been modified comprises the first agent being configured to detect that the view of the current validation rules version data has been modified.

8. The system of claim 6, wherein the first agent comprises a client agent of a cluster, and the second agent comprises a server agent of the cluster.

9. The system of claim 6, wherein the at least one repository is configured to have the current version of the validation rules configuration file uploaded thereto, and wherein the at least one first server is configured to have the current validation rules version data thereon modified in response to the current version of the validation rules configuration file being uploaded to the at least one repository and before the payment gateway determines that the current validation rules version data has been modified.

10. The system of claim 6, wherein the payment gateway is configured to delete a copy of a previous version of the validation rules configuration file.

11. A computer program product for configuring a payment gateway of a transaction service provider system, the computer program product comprising at least one non-transitory computer-readable medium including one or more instructions that, when executed by at least one processor, cause the at least one processor to:

monitor current validation rules version data stored on at least one first server, the current validation rules version data associated with a current version of a validation rules configuration file for a payment gateway of a transaction service provider system that receives transaction authorization requests from merchant systems and communicates with issuer systems, the at least one first server remote from the payment gateway, wherein the current validation rules version data comprises at least one key associated with at least one identifier of the validation rules configuration file and at least one value associated with the current version, wherein monitoring comprises performing, by a first agent on the payment gateway, a watch command to monitor a view of the at least one value from a second agent on the at least one first server based on the at least one key associated with the at least one identifier of the validation rules configuration file;

determine that the current validation rules version data stored on the at least one first server has been modified;

in response to determining that the current validation rules version data has been modified, invoke a configuration service, wherein the configuration service retrieves the current version of the validation rules configuration file from at least one repository based on the current validation rules version data, the at least one repository comprising at least one second server remote from the payment gateway and the at least one first server;

store a copy of the current version of the validation rules configuration file retrieved by the configuration service;

receive a first transaction authorization request from a merchant system;

apply the copy of the current version of the validation rules configuration file to the first transaction authorization request; and validate the first transaction authorization request based on applying the copy of the current version of the validation rules configuration file to the first transaction authorization request.

12. The computer program product of claim 11, wherein determining the current validation rules version data stored on the at least one first server has been modified comprises detecting, by the first agent, that the view of the current validation rules version data has been modified.

13. The computer program product of claim 11, wherein the first agent comprises a client agent of a cluster, and the second agent comprises a server agent of the cluster.

14. The computer program product of claim 11, wherein the at least one repository is configured to have the current version of the validation rules configuration file uploaded thereto, and wherein the at least one first server is configured to have the current validation rules version data thereon modified in response to the current version of the validation rules configuration file being uploaded to the at least one repository and before the payment gateway determines that the current validation rules version data has been modified.

15. The computer program product of claim 11, wherein the one or more instructions, when executed by the at least one processor, further cause the at least one processor to delete a copy of a previous version of the validation rules configuration file.

* * * * *